Oct. 30, 1962 L. J. SEMON 3,061,691

TELEPHONE BOARD LAMP TESTER

Filed March 31, 1961 2 Sheets-Sheet 1

INVENTOR.
LAWRENCE J. SEMON
BY
Elliott & Pastoriza
ATTORNEYS

INVENTOR.
LAWRENCE J. SEMON
BY
*Elliott & Pastoriza*
ATTORNEYS

United States Patent Office 3,061,691 Patented Oct. 30, 1962

3,061,691
TELEPHONE BOARD LAMP TESTER

Lawrence J. Semon, 918 Ocean Front, Santa Monica, Calif.

Filed Mar. 31, 1961, Ser. No. 99,787
7 Claims. (Cl. 179—175.1)

This invention relates generally to telephone equipment and more particularly to a device for testing the lamps on a telephone board associated with a plurality of jacks to determine which lamps, if any, are burned out.

In certain telephone equipment such as in telephone answering switchboards, there are provided jacks corresponding to subscribers to the answering service together with a corresponding number of lamps which will light to indicate a call for any one particular subscriber. The operator may then answer the call on behalf of the subscriber if the subscriber is out by plugging into the jack associated with the lighted lamp.

In the event one or more of the lamps should burn out, there is no way of determining whether or not a subscriber's line is being called. Thus, unless periodic testing of the lamps takes place, the only manner in which a service operator could be apprised of a burned-out lamp would be by complaints from the subscriber.

To avoid such complaints, the lamps are presently periodically tested by simply dialing each number on the switchboard corresponding to the particular jack and lamp to be tested to see if the lamp lights. If there are eighty or more lamps on each board, this dialing operation becomes a time-consuming operation. Further, dialing of the subscriber's number will cause his telephone to ring if he happens to be in during the testing period.

The actual wiring for the lamps on the various boards is generally concealed and not readily accessible to provide other means for testing the lamps. In fact, to provide adequate access to the lamps from the exterior of the panels by means other than the jacks themselves would require extensive rewiring of many hundreds of existing boards.

With the foregoing in mind, it is a primary object of this invention to provide a lamp tester which will enable an operator to test all of the lamps on a switchboard successively and rapidly without the necessity of dialing a subscriber's number associated with a particular lamp and jack.

More particularly, it is an object to provide a lamp tester so designed as to be able to operate with all of the different types of boards presently in use so that a single unit is adaptable to differently wired jacks and boards.

Briefly, these and many other objects and advantages of this invention are attained by providing a casing structure having a plug protruding from one end and a plug socket in its other end. The plug socket includes tip, ring, and sleeve contacts for connection to the tip, ring, and sleeve terminals of a cord plug. Within the casing itself there is provided a circuit including various push button operated switches which will connect the tip, ring, or sleeve contacts associated with the plug socket to the plug itself. With this arrangement, battery voltage on the sleeve terminal or ground on the tip terminal of the cord plug may be connected through the medium of the circuit within the casing to the plug to complete an appropriate power circuit through a board lamp when the plug is inserted in the jack associated with the particular lamp to be tested.

The purpose for the various switches in the circuit is to enable the test device to be adapted to different types of switchboard sockets having different wiring connections. For example, some sockets include a battery voltage source and thus require grounding of certain elements to cause the lamps to operate; others require an external battery or generator voltage source to operate the lamp.

To enable further different type combinations of jacks to be tested by a single device, the plug portion of the device itself terminates in an asymmetrical end portion which is adapted to engage either the tip or ring of the jack, dependent upon the orientation of the end portion when inserting the plug into the jack.

A better understanding of the invention will be had by referring to the preferred embodiment thereof as illustrated in the accompanying drawings, in which.

Figure 1:
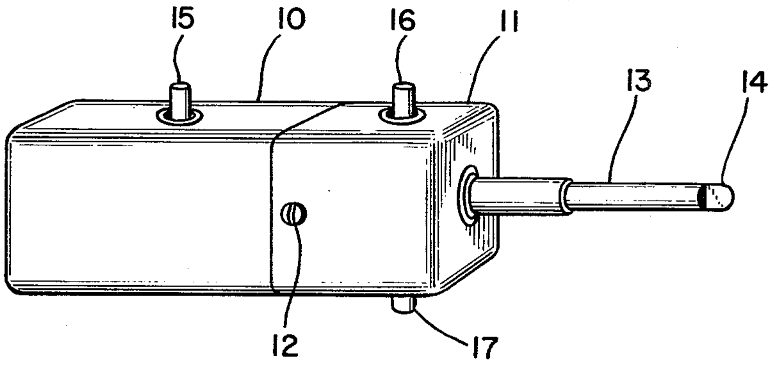
FIGURE 1 is a perspective view of the lamp tester of this invention.

FIGURES *5a*, *5b*, *6a*, *6b*, *7a*, *7b*, *8a*, and *8b* are schematic diagrams illustrating different types of jacks and associated lamps with which the lamp tester of FIGURE 1 may be used.

Referring first to FIGURE 1, the lamp tester comprises a main casing 10 provided with a cover casing 11 held in place by a set screw 12. From the cover casing 11 there extends a plug 13 terminating in an asymmetrical end portion 14 hereinafter referred to as a "spade." First, second and third push buttons 15, 16, and 17 are arranged to be externally operated by a person holding the casing 10 for selective switching of a circuit within the casing as will become clearer as the description proceeds.

Figure 2:
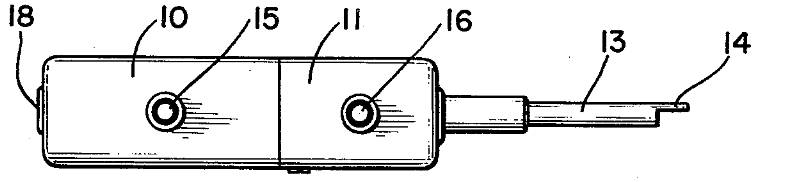
FIGURE 2 is a top plan view thereof.

With particular reference to FIGURE 2, it will be noted that the casing also includes a plug socket 18 at its rear end. The socket 18 is arranged to receive a cord plug which is adapted to supply a battery voltage through the circuit within the casing 10 and, depending upon the operation of the switch buttons 15, 16, and 17 to effect a suitable connection to the spade 14. Thus, when the plug is inserted in a jack associated with a particular lamp on a telephone switchboard to be tested, a power circuit is completed to the lamp through the spade so that whether or not the particular lamp is burned out may be immediately determined. The reason for the various different push buttons and asymmetrical end portion or spade 14 is to enable the device to be used with the various different types of switchboards presently in use.

Figure 3:
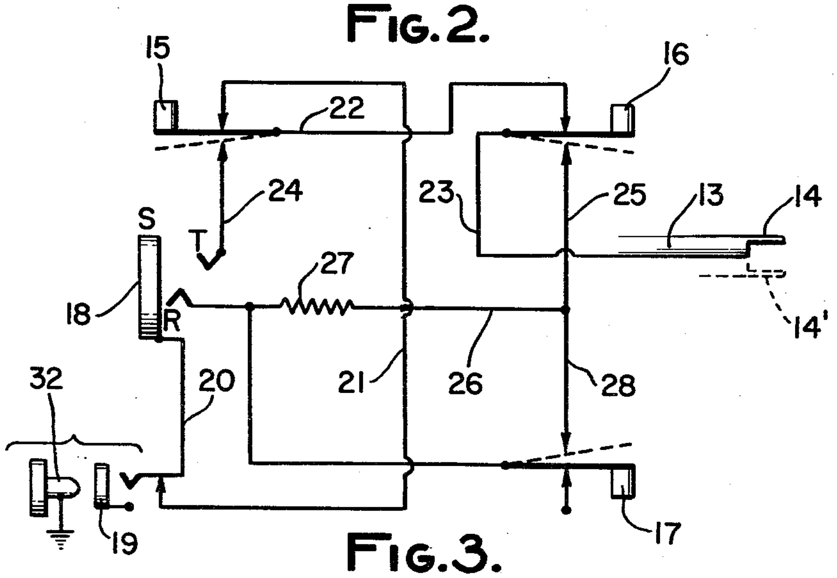
FIGURE 3 is a schematic circuit diagram of the circuit within the unit disclosed in FIGURES 1 and 2.

Referring now to FIGURE 3, the circuit and push button switches within the casing 10 are shown in detail. Referring to the left of the drawing, it will be noted that the plug socket 18 includes tip, ring, and sleeve contacts T, R, and S. Also included on the rear portion of the casing is a small ground jack 19 for connecting ground to the sleeve S through a lead 20 when a grounded plug 32 is received therein.

As shown, the sleeve S normally connects through the lead 20 to conductor 21 and, by way of push button switch 15, lead 22, push button switch 16, and lead 23 to plug 13 and spade 14. Thus, when the various switches are in their normal or unactuated positions, the sleeve contact of the plug socket 18 is connected to the spade 14.

If the first push button 15 is now actuated to its dotted line position, the tip contact T of the plug socket 18 is connected through the lead 24 and the push button 15, lead 22, push button 16, and lead 23 to the spade 14.

Operation of the second push button 16 to its dotted line position will connect the spade 14 through the lead 25 and a center lead 26 to a resistance 27, the other end of which connects to the ring contact R of the plug socket 18.

If the third switch button 17 is actuated at the same time as the switch button 16, the resistance 27 is shorted out of the circuit by conductor 28 so that the ring terminal R connects directly through the switch button 17, conductor 28, conductor 25, switch button 16, and conductor 23 to the spade 14.

Figure 4:
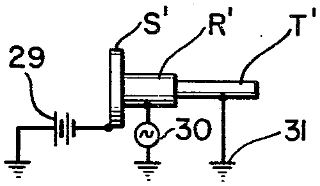
FIGURE 4 is a schematic diagram of a cord plug for use with the circuit of FIGURE 3.

FIGURE 4 schematically illustrates a typical cord plug which, when the device is used, is received within the plug socket 18 of FIGURE 3. As shown, the cord plug includes sleeve, ring, and tip terminals S', R', and T', respectively. As shown, the sleeve terminal S' usually has battery voltage as schematically illustrated by the battery 29. The ring terminal R', on the other hand, is provided with generator voltage as indicated schematically by the generator 30, and the tip T' is grounded as indicated at 31, when the ringing key associated with the cord plug is closed. In use, the cord plug is inserted within the plug socket 18 of FIGURE 3 and the ringing key is momentarily closed during testing of the lamp. In certain instances when only the generator voltage is to be used, it is preferably to provide a dead ground on the sleeve contact S of the plug socket 18 and towards this end the ground plug 32 shown in FIGURE 3 is inserted in the ground jack 19 to ground the sleeve through the conductor 20.

By providing the asymmetrical end portion in the form of the spade 14, it is possible when inserting the plug 13 in the jack associated with the lamp to be tested to either have the spade engage the ring terminal or the tip terminal in the jack. Thus, for example, if the device is inserted with the spade to the left as shown in FIGURES 1 and 2, the tip terminal in the jack will be engaged by the spade. On the other hand, if the device is turned over so that the spade is on the right as indicated at 14' in the schematic diagram of FIGURE 3, then the ring terminal in the jack will be engaged.

The purpose for the foregoing will become clearer by new referring to FIGURES 5 through 8, each of which represents a distinct type of jack. Thus, depending upon the type of jacks employed, the lamp tester must be adapted for use with the particular jack in order to complete a power circuit to the lamp.

Figure 5A:
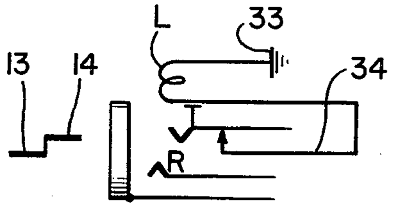
Figure 5B:
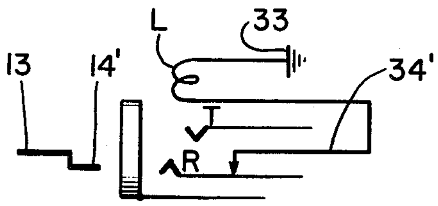

Considering first FIGURES 5*a* and 5*b*, there is shown a typical jack having tip and ring terminals T and R. In the jack of FIGURE 5*a*, the tip terminal connects through a load 34 to a lamp L. The other side of the lamp is grounded at 33. The jack in FIGURE 5*b* on the other hand is identical except that the ring terminal is connected to the lamp, as indicated by the lead 34', the other side of the lamp being again grounded as at 33. In order to test whether the lamp L is burned out or not, it is thus necessary that a voltage be applied to the tip terminal in the case of the jack of FIGURE 5*a* and to the ring terminal in the case of the jack of FIGURE 5*b* to complete a power circuit through the lamp L.

Referring once again to FIGURE 3, with the cord plug of FIGURE 4 inserted within the plug socket 18, the battery voltage 29 will exist on the sleeve contact S. When none of the push button switches are operated, this voltage on the sleeve S will be communicated through the conductor 20, conductor 21, push button switch 15, conductor 22, push button switch 16, and conductor 23 to the spade 14. Thus, when the plug 13 is inserted in the jack of FIGURE 5*a*, the spade 14 will engage the tip terminal T in the jack and provide battery voltage through the lead 34 and lamp L to ground at 33. If the lamp is illuminated, it is functioning properly, and if it is not illuminated, it is assumed to be burned out. If the switchboard has a jack of the type shown in FIGURE 5*b*, the user physically turns over the lamp tester as shown in FIGURE 2 so that the spade 14 assumes the position 14' and thus when inserted in the jack will engage the ring terminal R to complete a power circuit through the lead 34' to the lamp.

Figure 6A:
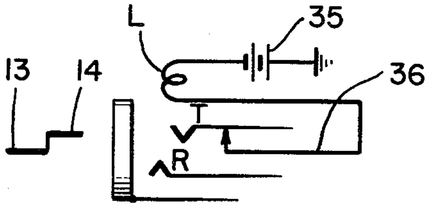
Figure 6B:
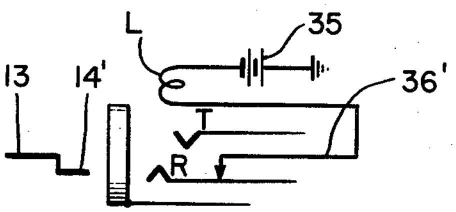

The jacks in FIGURES 6*a* and 6*b* are also arranged to be properly engaged to energize their associated lamps, depending upon the orientation of the spade 14. In these jacks, however, a battery is provided at 35 for illuminating the lamp L. In the jack shown in FIGURE 6*a*, the lamp connects to the tip terminal T through a lead 36, and in FIGURE 6*b*, to the ring terminal R through a lead 36'.

To test a jack of the type shown in FIGURES 6*a* and 6*b*, it is necessary to apply ground to the tip or ring respectively by the spade 14. To achieve this, the first push button 15 of FIGURE 3 is depressed so that ground from the cord plug terminal T' is provided on the tip contact T of the plug socket 18 and passed through the lead 24 and push button switch 15 which is now depressed. From switch 15, the connection is completed through the lead 22, push button switch 16, and lead 23 to the spade 14. Thus, when the spade is inserted in the jack of FIGURE 6*a*, the tip terminal T will be grounded, thereby completing the lamp circuit through the lead 36. When the orientation of the spade is reversed as shown in FIGURE 6*b* at 14', the ring will be grounded, thereby completing a power circuit through the lamp L and lead 36'.

Figure 7A:
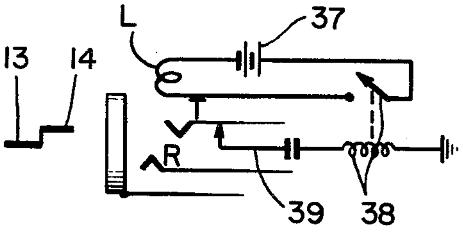
Figure 7B:
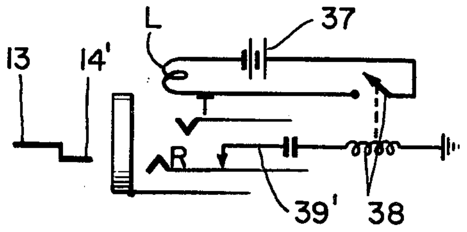

For the type of jacks illustrated in FIGURES 7*a* and 7*b*, the lamp circuit is energized by a battery 37 when connected by a relay 38. For this particular type of jack, the relay 38 will be properly energized by applying a specific generator voltage on the tip T in the case of FIGURE 7*a* or on the ring R in the case of FIGURE 7*b*. This proper voltage is derived from the circuit of FIGURE 3 by depressing the second switch button 16. Depressing this switch button will connect the spade 14 of the plug 13 through the lead 23 push button 16, lead 25, lead 26, and resistance 27 to the ring contact R.

Referring to FIGURE 4, it will be noted that the corresponding ring terminal R' includes generator voltage 30. Thus, this generator voltage is applied to the spade 14 across the resistance 27 and when the plug is inserted in the jack of FIGURE 7*a*, the relay 38 is operated to close the power circuit through the lamp L. In case a jack of the type shown in FIGURE 7*b* is employed, the spade is simply reoriented as indicated at 14' so that generator voltage with the resistance R is applied to the ring terminal R to operate the relay 38.

Figure 8A:
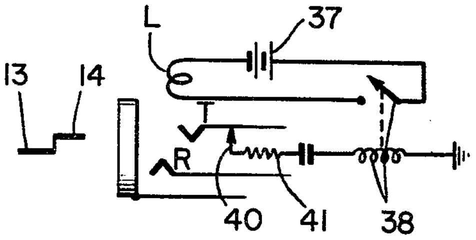
Figure 8B:
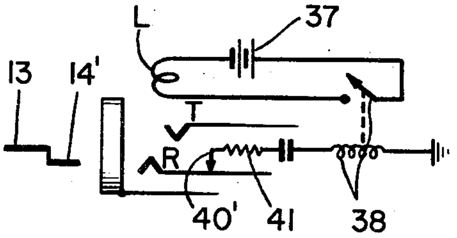

Finally, the jacks illustrated in FIGURES 8*a* and 8*b* are somewhat similar to those shown in FIGURES 7*a* and 7*b* except that the generator voltage without the voltage dropping resistance must be applied in order to operate the relay. This necessitates removing the resistance in FIGURE 3 and is accomplished by operating the third push button 17 simultaneously with the second push button 16. With both push buttons depressed, the resistance 27 is shunted out of the circuit and the ring contact is connected directly to the spade 14. Proper voltage is then provided for operating the relay 38 in each instance to complete the circuit to the lamp L.

During an actual testing operation, the user determines the particular types of jacks in the switchboard whose lamps are being tested and holds the various buttons depressed as required, if any. The user may then simply and quickly pass down the entire row of jacks inserting and removing the plug member 13 and observing whether or not the corresponding lamp is illuminated. In those instances in which the lamp is not illuminated, a note is made, and these particular lamps may then be tested by dialing the number. It is possible that some other portion of the circuit may be inoperative rather than the lamp itself. Thus, the lamp tester may indicate other disorders in addition to simply a burned-out lamp.

From the foregoing description, it will be evident that the present invention has provided an extremely versatile lamp tester. Not only is the tedious operation of dialing each and every subscriber's number to test the lamp associated with the subscriber's jack eliminated, but complicated reworking of switchboard wiring is avoided. Moreover, as a consequence of the unique asymmetrical tip portion of the device as well as the various combinations of switches employed therein, all of the various different types of switchboard jacks and associated lamps now in operation can be tested by the lamp tester.

Various changes falling clearly within the scope and spirit of this invention will occur to those skilled in the art. The lamp tester is therefore not to be thought of as limited to the exact embodiment set forth merely for illustrative purposes.

What is claimed is:

1. A lamp tester including: a plug adapted to be inserted in a board jack associated with a lamp to be tested, said plug terminating in an asymmetrical end portion for engaging the tip terminal only of said jack when inserted with said end in one orientation and for engaging the ring terminal only of said jack when inserted with said end in an opposite orientation; and circuit means connected to said plug for completing a power circuit to said lamp whereby illumination of said lamp upon insertion of said plug indicates it is operating properly.

2. A lamp tester for use with a telephone board having a plurality of jacks and a corresponding number of lamps respectively associated therewith, said lamp tester including: a plug for insertion into the jack of said board associated with the particular lamp to be tested, said plug including an asymmetrical end portion for engaging the tip terminal only of said jack when inserted with said end in one orientation and for engaging the ring terminal only of said jack when inserted with said end in an opposite orientation; and circuit means connected to said asymmetrical end portion for completing a power circuit to said particular lamp when said plug is properly inserted in said jack whereby illumination of said lamp upon insertion of said plug will indicate if it is functioning properly.

3. A lamp tester according to claim 2, in which said circuit means includes a plug socket having tip, ring, and sleeve contacts for receiving a cord plug having tip, ring, and sleeve members adapted to provide ground, generator voltage, and battery voltage to said tip, ring, and sleeve contacts, respectively; and button operated switches for enabling selective connection of said tip, ring, and sleeve contacts to said asymmetrical end portion of said plug.

4. A lamp tester according to claim 3, in which said circuit further includes a ground jack connected to said sleeve contact so that grounding said ground jack by external means places ground on said sleeve contact; a resistance connected between said ring contact and through one of said button operated switches to said asymmetrical end portion; and conductor means connected through another of said button operated switches shunting said resistance whereby said resistance can be shunted out of circuit.

5. A lamp tester for use with a telephone board having a plurality of board jacks and a corresponding number of lamps respectively associated therewith, said lamp tester comprising, in combination: a casing; a plug projecting from one end of said casing for insertion into the board jack of said board associated with the particular lamp to be tested; a plug socket in said casing including tip, ring, and sleeve contacts, a resistance in said casing; first, second and third push button switches within said casing and operable from the exterior thereof; and conductor means connected to said tip, ring, and sleeve contacts, and to said resistance, plug, and said push button switches such that when none of said switches is actuated said sleeve contact is connected to said plug, when said first switch is actuated said tip contact is connected to said plug, when said second switch is actuated said resistance is connected between said ring contact and plug; and when both said second and third switches are operated said ring is connected directly to said plug, whereby an appropriate power circuit may be completed to said lamp upon insertion of a cord plug having tip, ring, and sleeve members adapted to provide ground, generator voltage, and battery voltage to said tip, ring, and sleeve contacts respectively when said cord plug is received in said plug socket.

6. A lamp tester according to claim 5, in which said plug terminates in an asymmetrical end portion shaped to engage the tip terminal only in said board jack when inserted with said end in one orientation and to engage the ring terminal only of said board jack when inserted with said end in an opposite orientation.

7. A lamp tester including: a plug adapted to be inserted in a board jack associated with a lamp to be tested, said plug terminating in a narrowed end portion having different widths when viewed in planes at right angles intersecting along the axis of said plug, said narrowed end portion engaging a given conducting portion of said jack when in a given orientation and when said plug is received in said jack; and circuit means connected to said plug for completing a power circuit to said lamp whereby illumination of said lamp upon insertion of said plug into said jack indicates it is operating properly.

References Cited in the file of this patent

UNITED STATES PATENTS

| | | |
|---|---|---|
| 1,448,576 | Strickler | Mar. 13, 1923 |
| 1,808,902 | Mueller | June 9, 1931 |
| 2,249,153 | Martin | July 15, 1941 |
| 2,572,104 | Bowne | Oct. 23, 1951 |
| 2,984,702 | Semon | May 16, 1961 |